Patented Dec. 21, 1948

2,456,911

UNITED STATES PATENT OFFICE 2,456,911

DISUBSTITUTED ACETAMIDYL DERIVATIVES OF AMINO QUINOLINES

William F. Bruce, Penfield, Upper Darby, Pa., assignor to Wyeth Incorporated, Philadelphia, Pa., a corporation of Delaware No Drawing. Application May 4, 1945, Serial No. 592,062

7 Claims. (Cl. 260—287)

This invention relates in general to the synthesis of a novel group of organic chemical compounds of the quinoline series, having valuable therapeutic properties and in particular, relates to the synthesis of the quinoline compounds in which the di-N substituted acetamidyl group (—CH$_2$CONRR') is attached through an amino group or bridge to a carbon atom of an alkoxy substituted quinoline ring. Structurally, these quinoline compounds can be represented by the formula QNHCH$_2$CONRR' wherein Q is an alkoxy substituted quinoline ring and R and R' are similar or dissimilar hydrocarbon radicals such as alkyl, aryl, aralkyl or cycloalkyl groups, for instance, methyl, ethyl, propyl, butyl, phenyl, benzyl, cyclopentyl, and cyclohexyl radicals or —NRR' together constitutes a substituted or unsubstituted heterocyclic ring. The compounds of the invention are particularly useful as spasmolytic and local anesthetic agents.

The preferred embodiment of my invention is directed to the synthesis of the more specific group of compounds represented by the generic formula

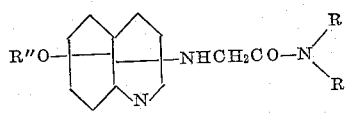

wherein R, R' and R'' are similar or dissimilar alkyl, aryl, aralkyl, or cycloalkyl radicals or wherein NRR' is a substituted or unsubstituted heterocyclic ring such as piperidyl.

In general, the compounds of the invention may be synthesized by reacting the appropriate N,N-dialkyl-alpha-chloracetamide with the requisite amino quinoline such as 6-methoxy-8-aminoquinoline in the presence of sodium bicarbonate, piperidine or other acid acceptor substances.

In order to further a better understanding of this invention, illustrative specific procedures for the preparation of representative compounds falling within the generic formula are set forth in the following examples.

EXAMPLE I

Preparation of N,N-diethyl-alpha-(6-methoxy-quinolinyl-8)-aminoacetamide 250 grams of diethylamine (360 cc.) were dissolved in 3000 cc. of ether and 180 grams (130 cc.) of chloracetyl chloride contained in 500 cc. of ether were slowly added from a dropping funnel. During the addition, the ether solution of the diethylamine was kept in an ice bath maintained at a temperature of 10 to 20° C. Upon completion of the reaction, the precipitate of diethylamine hydrochloride was filtered off, the ether was evaporated and the residual oil was distilled at 148 to 150° C. under a vacuum of 55 mm. The yield of N,N-diethyl-alpha-chloracetamide was 240 grams.

30 grams of 6-methoxy-8-aminoquinoline and 20 cc. of N,N-diethyl-alpha-chloracetamide were dissolved in 400 cc. of butyl alcohol to which was added 50 cc. of piperidine as an acid acceptor. After refluxing for twenty hours, the alcohol was vacuum evaporated off and 3000 cc. of diethyl ether added to the residue. The large precipitate of piperidine hydrochloride, thus obtained, was filtered off. The ethereal filtrate was distilled on a water bath to remove the ether and the residue was distilled at 175 to 180° C. under vacuum of 48 mm. to yield 40 grams of the desired N,N-diethyl-alpha-(6-methoxy-quinolinyl-8)-aminoacetamide.

Analysis.—Calculated for C$_{16}$H$_{21}$N$_3$O$_2$: 67.0% C, 7.32% H; found: 66.8% C, 7.64% H.

EXAMPLE II

Preparation of N,N-diisopropyl-alpha-(6-methoxy-quinolinyl-8)-aminoacetamide 100 grams (135 cc.) of diisopropylamine were dissolved in ether and a solution of 60 grams (40 cc.) of chloracetyl chloride in 500 cc. of ether were added dropwise thereto while cooling the reaction mixture in an ice bath at 10 to 20° C. Upon completion of the reaction, the isopropylamine hydrochloride was filtered off, the ether evaporated from the ethereal filtrate and the residual oil distilled at 162 to 164° C. under a vacuum of 55 mm. The yield of N,N-diisopropyl-alpha-chloracetamide was 80 grams.

Analysis.—Calculated for C$_8$H$_{16}$NOCl: 54.05% C, 9.03% H; found: 54.11% C, 9.31% H.

30 grams of 6-methoxy-8-aminoquinoline and 30 grams of N,N-diisopropyl chloracetamide were dissolved in 400 cc. of butyl alcohol to which 50 cc. of piperidine had been added. After refluxing for twenty hours, the alcohol was vacuum distilled off. Piperidine hydrochloride was filtered off after being precipitated by the addition of 3000 cc. of ether to the residue remaining after the vacuum distillation. After removal of the ether by evaporation on a steam bath, an oil was obtained which distilled at 178 to 180° C. under a vacuum of 45 mm. The yield of N,N-diisopropyl-alpha-(6-methoxy-quinolinyl-8)-aminoacetamide amounted to 50 grams.

Analysis.—Calculated for C$_{18}$H$_{25}$N$_3$O$_2$: 68.55% C, 7.95% H; found: 68.21% C, 8.14% H.

EXAMPLE III

Preparation of N,N-di-n-propyl-alpha-(6-methoxy-quinolinyl-8)-aminoacetamide 100 grams of di-n-propylamine were dissolved in ether and a solution of 60 grams (40 cc.) of chloracetyl chloride in 500 cc. of ether was added dropwise thereto with stirring while the reaction flask was kept in an ice bath at a temperature of 10 to 20° C. The precipitate of di-n-propylamine hydrochloride formed during the reaction was filtered off and the ether evaporated. The oily N,N-di-n-propyl-alpha-chloracetamide, remaining after evaporation of the ether, distilled at 152 to 154° C. under a vacuum of 55 mm. and amounted to 71 grams.

Analysis.—Calculated for $C_8H_{16}NOCl$: 54.05% C, 9.03% H; found: 54.19% C, 9.48% H.

30 grams of 6-methoxy-8-aminoquinoline and 30 grams of N,N-di-n-propyl-alpha-chloracetamide were dissolved in 400 cc. of butyl alcohol and refluxed with 50 cc. of piperidine for twenty hours. The alcohol was removed by vacuum distillation and the residue was treated with 3000 cc. of ether to precipitate out piperidine hydrochloride. After filtering off the piperidine hydrochloride, the ether was evaporated from the resulting filtrate to obtain an oil which distilled at 195° C. under a vacuum of 48 mm. The yield of N,N-di-n-propyl-alpha-(6-methoxy-quinolinyl-8)-aminoacetamide amounted to 52 grams.

Analysis.—Calculated for $C_{18}H_{25}N_3O_2$: 68.55% C, 7.95% H; found: 68.47% C, 8.23% H.

EXAMPLE IV

Preparation of N,N-diisobutyl-alpha-(6-methoxy-quinolinyl-8)-aminoacetamide 250 cc. (190 grams) of diisobutylamine were dissolved in 3000 cc. of ether contained in a flask which was immersed in an ice bath maintained at a temperature of 10 to 20° C. and a solution of 60 cc. (84 grams) of chloracetyl chloride in 500 cc. of ether were added dropwise thereto. The diisobutylamine hydrochloride formed during the reaction was filtered off and the ether evaporated from the filtrate. The oily N,N-diisobutyl-alpha-chloracetamide thus obtained was distilled at 166 to 168° C. under a vacuum of 58 mm. and amounted to 160 grams.

Analysis.—Calculated for $C_{10}H_{20}NOCl$: 58.4% C, 9.75% H; found: 58.13% C, 10.01% H.

30 grams of 6-methoxy-8-aminoquinoline, 35.2 grams (32 cc.) of N,N-diisobutyl-alpha-chloracetamide and 50 cc. of piperidine were dissolved in 400 cc. of butyl alcohol and refluxed for twenty hours. The alcohol was removed in vacuo and upon the addition of 3000 cc. of ether to the residue, a large precipitate of piperidine hydrochloride was obtained. The piperidine hydrochloride was filtered off and upon evaporation of the ether from the filtrate, there was obtained N,N-diisobutyl-alpha-(6-methoxy-quinolinyl-8)-aminoacetamide which was an oil boiling at 200 to 205° C. under a vacuum of 47 mm. The yield of product amounted to 48 grams.

Analysis.—Calculated for $C_{20}H_{29}N_3O_2$: 70.0% C, 8.46% H; found: 69.72% C, 8.81% H.

EXAMPLE V

Preparation of N,N-di-n-butyl-alpha-(6-methoxy-quinolinyl-8)-aminoacetamide 25 cc. of di-n-butylamine were dissolved in 3000 cc. of ether contained in a reaction flask immersed in an ice bath kept at a temperature of 10 to 20° C. and 60 cc. (84 grams) of chloracetyl chloride in 500 cc. of ether were added dropwise thereto. Upon completion of the reaction, the ether insoluble di-n-butylamine hydrochloride was filtered off, the ether removed from the filtrate, and the residual oil distilled at 180 to 182° C. under a vacuum of 55 mm. The yield of N,N-di-n-butyl-alpha-chloracetamide thus obtained was 150 grams.

Analysis.—Calculated for $C_{10}H_{20}NOCl$: 58.4% C, 9.75% H; found: 58.31% C, 9.94% H.

30 grams of 6-methoxy-8-aminoquinoline, 35.2 grams (32 cc.) of N,N-di-n-butyl-alpha-chloracetamide and 50 cc. of piperidine were dissolved in 400 cc. of butyl alcohol and refluxed for twenty hours. The alcohol was vacuum evaporated and 3000 cc. of diethyl ether were added to the residue. The large precipitate of piperidine hydrochloride, thus obtained, was filtered off and the ether distilled off from the filtrate. The oily residue which remained was distilled at 212 to 214° C. under a vacuum of 47 mm. The yield of N,N-di-n-butyl-alpha-(6-methoxy-quinolinyl-8)-aminoacetamide amounted to 51 grams.

Analysis.—Calculated for $C_{20}H_{29}N_3O_2$: 70.0% C, 8.46% H; found: 69.84% C, 8.63% H.

EXAMPLE VI

Preparation of N,N-di-n-amyl-alpha-(6-methoxy-quinolinyl-8)-aminoacetamide 45 grams of di-n-amylamine were dissolved in 2000 cc. of ether and a solution of 19 grams (13 cc.) of chloracetyl chloride in 250 cc. of ether were added dropwise. The temperature of the reaction was maintained at 10 to 20° C. by means of an ice bath. Upon completion of the reaction, the precipitate of di-n-amylamine hydrochloride was filtered off, the ether evaporated from the filtrate, and the residual oil distilled at 198 to 200° C. under a vacuum of 58 mm. The N,N-di-n-amyl-alpha-chloracetamide solidified in the receiving flask and amounted to 38 grams.

Analysis.—Calculated for $C_{12}H_{24}NOCl$: 61.7% C, 10.28% H; found: 61.58% C, 10.49% H.

30 grams of 6-methoxy-8-aminoquinoline, 41 grams of N,N-di-n-amyl-alpha-chloracetamide and 50 cc. of piperidine were dissolved in 400 cc. of butyl alcohol and then refluxed for twenty hours. The removal of piperidine hydrochloride and the isolation of the product was accomplished in the same manner as described in the above examples. The crude yield of N,N-di-n-amyl-(6-methoxy-quinolinyl-8)-aminoacetamide amounted to 47 grams in the form of an oil. Upon distillation at 220° under vacuum of 47 mm. the oil solidified to a solid.

Analysis.—Calculated for $C_{22}H_{33}N_3O_2$: 73.95% C, 8.90% H; found: 73.58% C, 8.88% H.

EXAMPLE VII

Preparation of alpha-(6-methoxy-quinolinyl-8)-aminoacetylpiperidide 200 grams of piperidine (230 cc.) were dissolved in 3000 cc. of diethyl ether and a solution of 88 cc. (131 grams) of chloracetyl chloride were added dropwise thereto while maintaining the temperature at 10 to 20° C. The piperidine hydrochloride was filtered off, the ether evaporated and the oil distilled at 166 to 169° C. under a vacuum of 55 mm. The yield of N-alpha-chloracetyl piperidine amounted to 11.5 grams.

30 grams of 6-methoxy-8-aminoquinoline, 28 grams of N-alpha-chloracetyl piperidine and 50 cc. of piperidine were dissolved in 400 cc. of butyl alcohol and refluxed for twenty hours. The alcohol was vacuum evaporated off and 3000 cc. of diethyl ether added to the residue to precipitate out piperidine hydrochloride. The piperidine hydrochloride was filtered off and the ethereal filtrate was first distilled on a water bath to remove the ether and then was distilled at 193 to 197° C. under a vacuum of 44 mm. on an oil bath to obtain 48 grams of alpha-(6-methoxy-quinolinyl-8)-aminoacetyl piperidide which is an oil.

Analysis.—Calculated for $C_{17}H_{21}N_3O_2$: 68.25% C, 7.03% H; found: 68.03% C, 7.40% H.

By procedures analogous to those described in the above examples, the appropriate aminoquinoline and the appropriate N,N-dialkyl-alpha-chloracetamide can be reacted to form the following substituted quinolines representative of those comprehended in this invention.

(1) N,N-diethyl-alpha-(5-methoxy quinolinyl-8)-aminoacetamide
(2) N,N-diethyl-alpha-(6-ethoxy quinolinyl-8)-aminoacetamide
(3) N,N-diethyl-alpha-(4-methoxy quinolinyl-8)-aminoacetamide
(4) N,N-diethyl-alpha-(3-methoxy quinolinyl-8)-aminoacetamide
(5) N,N-diethyl-alpha-(2-methoxy quinolinyl-8)-aminoacetamide
(6) N,N-diethyl-alpha-(7-methoxy quinolinyl-8)-aminoacetamide
(7) N,N-diethyl-alpha-(6-propoxy quinolinyl-8)-aminoacetamide
(8) N,N-diethyl-alpha-(6-butoxy quinolinyl-8)-aminoacetamide
(9) N,N-diethyl-alpha-(6-methoxy quinolinyl-7)-aminoacetamide
(10) N,N-diethyl-alpha-(6-methoxy quinolinyl-5)-aminoacetamide
(11) N,N-diethyl-alpha-(6-methoxy quinolinyl-4)-aminoacetamide
(12) N,N-diethyl-alpha-(6-methoxy quinolinyl-3)-aminoacetamide
(13) N,N-diethyl-alpha-(6-methoxy quinolinyl-2)-aminoacetamide
(14) N,N-diethyl-alpha-(6-methoxy quinolinyl-6)-aminoacetamide
(15) N,N-diethyl-alpha-(5-methoxy quinolinyl-2)-aminoacetamide
(16) N,N-diisopropyl-alpha-(6-ethoxy quinolinyl-8)-aminoacetamide
(17) N,N-di-n-propyl-alpha-(6-ethoxy quinolinyl-8)-aminoacetamide
(18) N,N-diisobutyl-alpha-(6-ethoxy quinolinyl-8)-aminoacetamide
(19) N,N-di-n-amyl-alpha-(6-ethoxy quinolinyl-8)-aminoacetamide
(20) N,N-diisopropyl-alpha-(4-ethoxy quinolinyl-8)-aminoacetamide
(21) N,N-diisopropyl-alpha-(3-methoxy quinolinyl-8)-aminoacetamide
(22) N,N-di-n-propyl-alpha-(4-methoxy quinolinyl-8)-aminoacetamide
(23) N,N-diisobutyl-alpha-(4-methoxy quinolinyl-8)-aminoacetamide
(24) N,N-di-n-amyl-alpha-(4-methoxy quinolinyl-8)-aminoacetamide
(25) N,N-di-n-propyl-alpha-(3-methoxy quinolinyl-8)-aminoacetamide
(26) N,N-diisobutyl-alpha-(3-methoxy quinolinyl-8)-aminoacetamide
(27) N,N-diisobutyl-alpha-(3-ethoxy quinolinyl-8)-aminoacetamide
(28) N,N-di-n-amyl-alpha-(3-methoxy quinolinyl-8)-aminoacetamide
(29) N,N-diisopropyl-alpha-(2-methoxy quinolinyl-8)-aminoacetamide
(30) N,N-di-n-propyl-alpha-(2-methoxy quinolinyl-8)-aminoacetamide
(31) N,N-diisobutyl-alpha-(2-ethoxy quinolinyl-8)-aminoacetamide
(32) N,N-di-n-amyl-alpha-(2-methoxy quinolinyl-8)-aminoacetamide
(33) N,N-diisopropyl-alpha-(7-methoxy quinolinyl-8)-aminoacetamide
(34) N,N-di-n-propyl-alpha-(7-methoxy quinolinyl-8)-aminoacetamide
(35) N,N-diisobutyl-alpha-(7-methoxy quinolinyl-8)-aminoacetamide
(36) N,N-di-n-amyl-alpha-(7-methoxy quinolinyl-8)-aminoacetamide
(37) N,N-diisopropyl-alpha-(6-propoxy quinolinyl-8)-aminoacetamide
(38) N,N-diisobutyl-alpha-(6-propoxy quinolinyl-8)-aminoacetamide
(39) N,N-diisopropyl-alpha-(6-butoxy quinolinyl-8)-aminoacetamide
(40) N,N-diisobutyl-alpha-(6-butoxy quinolinyl-8)-aminoacetamide
(41) N,N-di-n-amyl-alpha-(6-butoxy quinolinyl-8)-aminoacetamide
(42) N,N-diisopropyl-alpha-(6-methoxy quinolinyl-7)-aminoacetamide
(43) N,N-diisopropyl-alpha-(6-methoxy quinolinyl-5)-aminoacetamide
(44) N,N-diisopropyl-alpha-(6-methoxy quinolinyl-4)-aminoacetamide
(45) N,N-diisopropyl-alpha-(6-methoxy quinolinyl-3)-aminoacetamide
(46) N,N-diisopropyl-alpha-(6-methoxy quinolinyl-2)-aminoacetamide
(47) N,N-diisopropyl-alpha-(5-methoxy quinolinyl-8)-aminoacetamide
(48) N,N-dicyclohexyl-alpha-(6-ethoxy quinolinyl-8)-aminoacetamide
(49) N,N-dicyclopentyl-alpha-(6-methoxy quinolinyl-6)-aminoacetamide
(50) Alpha-(4-methoxy quinolinyl-8)-aminoacetyl piperidide
(51) Alpha-(3-methoxy quinolinyl-8)-aminoacetyl piperidide
(52) Alpha-(2-methoxy quinolinyl-8)-aminoacetyl piperidide
(53) Alpha-(7-ethoxy quinolinyl-8)-aminoacetyl piperidide
(54) Alpha-(6-butoxy quinolinyl-8)-aminoacetyl piperidide
(55) Alpha-(6-methoxy quinolinyl-7)-aminoacetyl piperidide
(56) Alpha-(6-ethoxy quinolinyl-5)-aminoacetyl piperidide
(57) Alpha-(6-ethoxy quinolinyl-3)-aminoacetyl piperidide
(58) Alpha-(6-ethoxy quinolinyl-2)-aminoacetyl piperidide
(59) Alpha-(5-ethoxy quinolinyl-6)-aminoacetyl piperidide
(60) N,N-ethyl-propyl-alpha-(6-methoxy quinolinyl-8)-aminoacetamide
(61) N,N-ethyl-n-butyl-alpha-(6-methoxy quinolinyl-8)-aminoacetamide
(62) N,N-n-propyl-n-butyl-alpha-(6-methoxy quinolinyl-8)-aminoacetamide
(63) N,N-ethyl-isopropyl-alpha-(6-methoxy quinolinyl-8)-aminoacetamide
(64) N,N-ethyl-isobutyl-alpha-(6-methoxy quinolinyl-8)-aminoacetamide
(65) N,N-isopropyl-isobutyl-alpha-(6-methoxy quinolinyl-8)-aminoacetamide
(66) N,N-ethyl-n-amyl-alpha-(6-methoxy quinolinyl-8)-aminoacetamide
(67) N,N-ethyl-allyl-alpha-(6-methoxy quinolinyl-8)-aminoacetamide
(68) N,N-ethyl-vinyl-alpha-(6-methoxy quinolinyl-8)-aminoacetamide
(69) N,N-ethyl-cyclopentyl-alpha-(6-methoxy quinolinyl-8)-aminoacetamide
(70) N,N-ethyl-propyl-alpha-(6-ethoxy quinolinyl-8)-aminoacetamide
(71) N,N-ethyl-n-butyl-alpha-(6-ethoxy quinolinyl-8)-aminoacetamide
(72) N,N-ethyl-n-propyl-n-butyl-alpha-(6-ethoxy quinolinyl-8)-aminoacetamide
(73) N,N-ethyl-isopropyl-alpha-(6-ethoxy quinolinyl-8)-aminoacetamide
(74) N,N-ethyl-isobutyl-alpha-(6-ethoxy quinolinyl-8)-aminoacetamide
(75) N,N-isopropyl-isobutyl-alpha-(6-ethoxy quinolinyl-8)-aminoacetamide
(76) N,N-ethyl-n-amyl-alpha-(6-ethoxy quinolinyl-8)-aminoacetamide
(77) N,N-ethyl-allyl-alpha-(6-ethoxy quinolinyl-8)-aminoacetamide
(78) N,N-ethyl-vinyl-alpha-(6-ethoxy quinolinyl-8)-aminoacetamide
(79) N,N-ethyl-cyclopentyl-alpha-(6-ethoxy quinolinyl-8)-aminoacetamide Many modifications of my invention will be apparent to those skilled in the art without departure therefrom or from the scope of the claims, and since the foregoing disclosure has been given by way of example for clearness and understanding only, no unnecessary limitations should be understood and the appended claims should be construed as broadly as the state of the art permits.

I claim:

1. Substituted alkoxyquinolines of the general formula

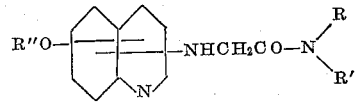

where the R″O radical may be substituted in any of the 2–7 positions and the

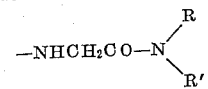

radical may be substituted in any of the 2–8 positions in the quinoline ring and where R″ is a lower alkyl radical and

is a radical selected from the group consisting of a piperidyl radical and a radical where R represents a member of the group consisting of alkyl and cycloalkyl radicals and R′ represents a member of the group consisting of alkyl, alkenyl and cycloalkyl radicals.

2. Substituted alkoxy quinolines, according to claim 1, wherein R″ is a lower alkyl group and R and R′ are alkyl radicals.

3. N,N-di-n-butyl-alpha-(6-methoxy quinolinyl-8)-aminoacetamide.

4. Substituted alkoxy quinolines, according to claim 1, wherein R″ is a lower alkyl radical and R and R′ cycloalkyl radicals.

5. N,N-di-cyclopentyl-alpha-(6-methoxy quinolinyl-8)-aminoacetamide.

6. Substituted alkoxy quinolines according to claim 1, wherein R″ is a lower alkyl radical and

constitutes a piperidyl radical.

7. Alpha-(6-methoxy quinolinyl-8)-acetyl piperidide.

WILLIAM F. BRUCE.

REFERENCES CITED

The following references are of record in the file of this patent:

FOREIGN PATENTS

| Number | Country | Date |
|---|---|---|
| 282,453 | Great Britain | Mar. 19, 1929 |

OTHER REFERENCES

Shriner et al., "Synthetic Antimalarials" (Review published at Bloomington, Ind.; 1941) page 11.

Williams, "Chemotherapy of Malaria" (published by Lederle Laboratories, Inc., New York, June, 1941), pp. 81, 82, 88, 141, and 143.

Chemical Abstracts, vol. 36 (1942), page 5176 [Citing Gaind et. al., J. Indian Chem. Soc., vol. 17, pages 619–622 (1941)].